United States Patent
Luis y Prado (10) Patent No.: US 10,461,524 B2
(45) Date of Patent: Oct. 29, 2019

(54) PORTABLE INVERTER CONNECTION CONTROL SYSTEM

(71) Applicant: Workshops for Warriors, San Diego, CA (US)

(72) Inventor: Hernán Luis y Prado, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 0 days.

(21) Appl. No.: 15/669,745

(22) Filed: Aug. 4, 2017

(65) Prior Publication Data

US 2019/0044324 A1 Feb. 7, 2019

(51) Int. Cl.
| | | |
|---|---|---|
| H02H 7/122 | (2006.01) | |
| H02H 7/20 | (2006.01) | |
| H02S 40/32 | (2014.01) | |
| H02H 1/00 | (2006.01) | |
| H02J 3/38 | (2006.01) | |

(52) U.S. Cl.
CPC .......... *H02H 7/205* (2013.01); *H02H 1/0007* (2013.01); *H02H 7/122* (2013.01); *H02J 3/383* (2013.01); *H02S 40/32* (2014.12)

(58) Field of Classification Search
CPC .......... H01H 9/548; H02H 3/006; H02H 3/33; H02J 7/027; H02J 9/062; B60L 3/0069; B60L 3/04
See application file for complete search history.

(56) References Cited

U.S. PATENT DOCUMENTS

| | | | |
|---|---|---|---|
| 6,169,669 B1 * | 1/2001 | Choudhury | H02J 9/062 307/66 |
| 7,547,990 B2 * | 6/2009 | Varzhabedian | H02J 7/027 307/66 |
| 2006/0118162 A1 | 6/2006 | Saelzer et al. | |
| 2014/0211345 A1 * | 7/2014 | Thompson | B60L 11/1816 361/42 |

OTHER PUBLICATIONS

OutBack Power Technologies, FLEXpowerOne Quick Start Guide, 2013, 4 pages.
John Wiles, "Making the Grid Connection", Home Power #89, Jun./Jul. 2002, pp. 124-127.
Gordon Blaine, "Removing the Neutral-Ground Bond in the Generator", gordonblaine.com, Nov. 7, 2015, 4 pages.

* cited by examiner

*Primary Examiner* — Rina I Duda
(74) *Attorney, Agent, or Firm* — Fish & Richardson P.C.

(57) ABSTRACT

A system for controlling the connection of an inverter to a load center. In one aspect, the system cooperatively connects an inverter supply to a load center. When the inverter supply is connected to the load center, the system unbonds the ground conductor of the inverter supply from the neutral conductor of the inverter supply. When the inverter supply is not connected to the load center, or is disconnected from the load center, the system bonds the ground conductor of the inverter supply to the neutral conductor of the inverter supply. The bonding and unbonding may be done by monitoring circuitry that drives a switch, or by an electromechanical switch integrating into a plug and that operates without monitoring circuitry.

8 Claims, 6 Drawing Sheets

PORTABLE INVERTER CONNECTION CONTROL SYSTEM

BACKGROUND

Portable power supplies, such as inverters and generators, are used to provide power during local outages and/or in isolated locations. Portable power supplies can also be used to augment available power of a local grid. For example, solar inverters are often used to augment power supplied to a building.

Solar inverters are especially versatile due to their relatively lightweight when compared to fuel generators. As such, they are generally more portable than fuel generators. Moreover, some conveyances, such a carts, utilize solar inverters as a power supply. The conveyance typically includes a battery bank that is charged by the solar panels of the solar inverter and that provides power to the drive system of the conveyance.

These conveyances may also be used as a power supply to a small building or local grid when not in use as a conveyance. However, care must be taken to ensure that power is provided in a safe and effective manner.

SUMMARY

This specification describes technologies relating to a connection control system for a portable inverter.

In general, one innovative aspect of the subject matter described in this specification can be embodied in a system, including an inverter side breaker and monitor, comprising power monitoring circuitry and switching circuitry, wherein: the power monitoring circuitry connects to a load center and monitors for power faults in a grid power feed connected to the load center by a grid side breaker that connects, in a first grid side breaker state, a grid power feed to the load center, wherein the grid power feed includes at least one hot conductor and a neutral conductor, and disconnects the grid power mains from the load center in a second grid side breaker state; and in response to not detecting a power fault, the power monitoring circuitry connects by the switching circuitry, after a connection time delay, an inverter supply to the load center by connecting a hot conductor of the inverter supply to a hot conductor of the load center, a neutral conductor of the inverter supply to the neutral conductor of the load center, and a ground conductor of the inverter supply to a ground conductor of the load center.

In general, another innovative aspect of the subject matter described in this specification can be embodied in a system including an inverter side breaker and monitor, comprising power monitoring circuitry and switching circuitry, wherein: the power monitoring circuitry connects to a load center and monitors for power faults in a grid power feed connected to the load center; and in response to detecting a power fault, the power monitoring circuitry precludes the inverter supply from being connected to the load center by the switching circuitry for at least a connection time delay.

In general, another innovative aspect of the subject matter described in this specification can be embodied in a system that includes inverter supply that includes a ground conductor, an neutral conductor, and a hot conductor, each of which may be respectively connected through an inverters supply connector to a load center of a load that is separate from the inverter supply; an inverter side breaker and monitor, comprising power monitoring circuitry and switching circuitry, wherein: the power monitoring circuitry monitors for a connection of the inverter supply connector to the load center, and wherein the power monitoring circuitry: in response to detecting the inverter supply connector is not connected to the load center, bonds the ground conductor of the inverter supply to the neutral conductor of the inverter supply; and in response to detecting the inverter supply connector is connected to the load center: unbonds the ground conductor of the inverter supply from the neutral conductor of the inverter supply, connects a ground conductor of the load center to the ground conductor of the inverter supply, and connects the neutral conductor of the load center to the neutral conductor of the inverter supply.

In general, another innovative aspect of the subject matter described in this specification can be embodied in coupler that includes a hot conductor coupling that includes an inverter side hot connector and a load center side hot connector, and wherein the inverter side hot connector and the load center side hot connector are connected by a first conductor; a neutral conductor coupling that includes an inverter side neutral connector and a load center side neutral connector, and wherein the inverter side neutral connector and the load center side neutral connector are connected by a second conductor; and a ground conductor coupling that includes an inverter side ground connector and a load center side ground connector, and wherein the inverter side ground connector and the load center side ground connector are connected by a third conductor; a neutral-to-ground bonding switch that is actuated from a closed state to an open state when the load side center neutral connector and the load side center ground connector are respectively connected to a load center side neutral conductor and a load center side ground conductor, wherein: in the closed state, the neutral-to-ground bonding switch connects the second conductor to the third conductor; and in the open state, the neutral-to-ground bonding switch disconnects the second conductor from the third conductor.

Particular embodiments of the subject matter described in this specification can be implemented so as to realize one or more of the following advantages. An inverter may be connected to load center by an inverter-side breaker and a control system automatically detects for power faults and precludes and/or disconnects the inverter automatically upon detection of a power fault. This eliminates the safety hazard that would result if the inverter were connected without the inverter-side breaker. Moreover, the inverter system precludes reconnection to the load center for a connection time delay, and thus the inverter supply may remain connected even in the event of a fault.

In situation in which the inverter has a neutral and ground bonded, the monitoring circuitry may automatically unbond the neutral from ground when the inverter is connected to a load center, and automatically bond the neutral to ground when the inverter is disconnected to a load center. This ensures that the neutral and ground of a portable inverter are bonded when the inverter is isolated from the load center, such as would be the case when the inverter is also used as a power source for a solar powered conveyance. However, when the inverter of the conveyance is used to provide power to a device load center that is part of a power system that is external to the solar powered conveyance, such as a modular building, the ground and neutral in the inverter supply are automatically unbounded.

In yet another implementation, an electro-mechanical switch in a coupler (e.g., a receptacle or plug) may be used instead of monitoring circuitry. The electro-mechanical switch causes the ground and neutral of the inverter to be bonded when the coupler is not coupled to a load center (e.g., the coupler is not receiving a plug from the load center). However, when the couple receives a plug from the load center, the electro-mechanical switch causes the ground and neutral of the inverter to become unbonded.

Both of the above implementations allow for automatic bonding and unbonding of the ground and neutral. This reduces the likelihood of accidents and nuisance trips that may result due to operator error.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The following written description is directed to systems, methods and apparatus that facilitate the deployment of portable inverters for use in providing power to loads. As used in this specification, a "portable" inverter is typically an inverter supply that can be readily transported among multiple locations for relative quick deployment. Examples of portable inverters include inverters supplies that are one-person portable (e.g., an inverter supply that includes an inverter, batteries and deployable solar panel that secured and carried in a backpack), multi-person portable (e.g., an inverter supply that is packaged into a container case that requires two or more persons to move), and inverter supplies that are used to power mobile conveyances, such as solar powered conveyances. In the case of the latter, the solar powered conveyance may have dual roles, such as the role of a utility vehicle while not being used as an inverter supply for a load that is separate from the solar powered cart.

Figure 1:
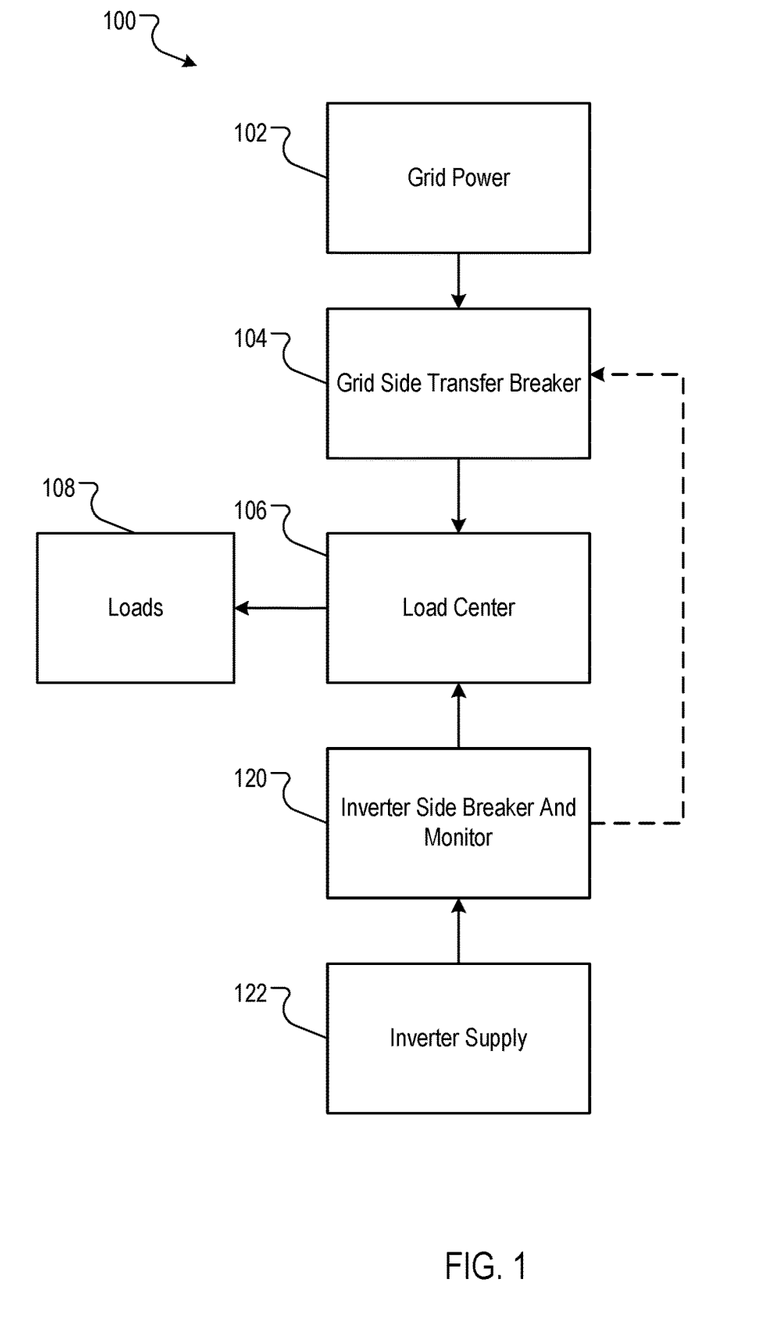
FIG. 1 is a system level diagram of a power system in which a portable inverter connection control system is implemented.

FIG. 1 is a system level diagram of a power system 100 in which a portable inverter connection control system is implemented. Grid power 102 is connected to a load center 106 by a grid side transfer breaker 104. The grid power 102 may be provided by a utility power grid, or by a smaller local grid that provides power to one or more load centers 106. Additionally, the grid side transfer breaker 104 is optional, and in some implementations, the grid power 102 may be connected to the load center 106 directly.

The load center 106 may be, for example, a main distribution box in a building or modular unit that has loads 108. The loads 108 may including lighting, machinery, data processing devices, and any other loads that are powered by AC power.

A control system is integrated into an inverter side breaker and monitor 120, which is interposed between the inverter supply 122 and the load center 106. Any appropriate inverter supply 122 may be used, and for brevity the details of the inverter supply 122 are omitted, other than the inverter supply 122 provides AC power through a hot conductor and a neutral conductor, and provides a ground conductor.

Within the inverter side breaker and monitor 120, monitoring and control circuitry is operatively coupled to an inverter side breaker that connects, when in a closed state, a hot conductor of the inverter supply to a hot conductor of the load center, a neutral conductor of the inverter supply to the neutral conductor of the load center, and a ground conductor of the inverter supply to a ground conductor of the load center.

The monitoring and control circuitry of the inverter side breaker and monitor is programmed in a manner to realize one or more of control process flows described with reference to FIGS. 2 and 3 below. Any appropriate data processing circuitry and power monitoring circuitry can be used to realize the operations described with reference to FIGS. 2 and 3 below. Such data processing circuitry may include controllers, processors, field programmable gate arrays, application specific integrated circuits, and the like. Monitoring circuitry may include voltage sensors, current sensors, and power meters.

Figure 2:
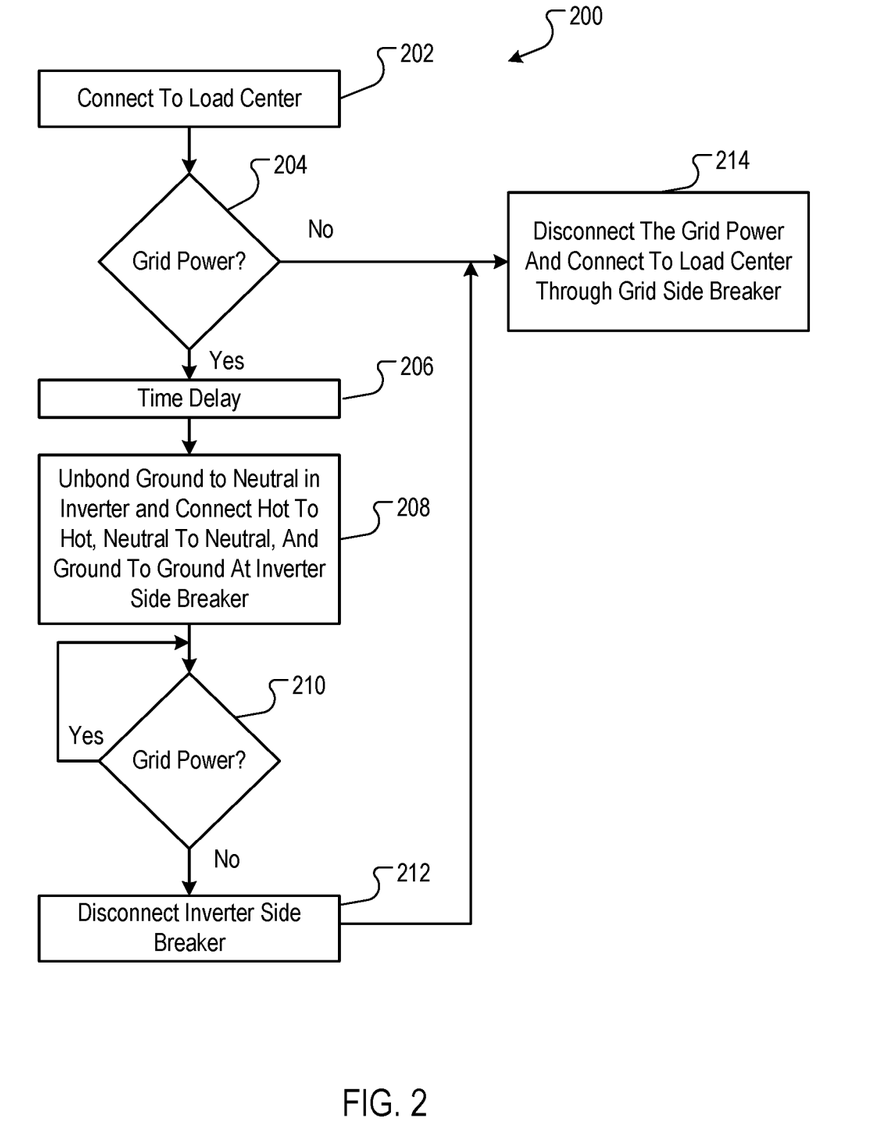
FIG. 2 is a flow diagram of an example process of controlling connection of a portable inverter to a load center.

FIG. 2 is a flow diagram of an example process 200 of controlling connection of a portable inverter to a load center 106. In the process 200 of FIG. 2, the grid power 102 is connected to the load center 106 by means of a grid side breaker, such as a transfer switch.

The power monitoring circuitry connects to a load center (202). For example, the inverter side breaker output terminals may be connected to the load center 106. The connection may be made by means of a power receptacle connected to the load center 106 that receives a plug that is connected to the inverter side breaker 120. The inverter side breaker 120 is normally open.

The power monitoring circuitry determines if there is grid power (204). For example, the power monitoring circuitry may include voltage sensors connected to load center side of the inverter side breaker and, by analyzing the detected signals, may determine whether the load center is connected to grid power. Any appropriate power monitoring process and circuitry may be used for this processing step.

The detection of grid power ensures that the inverter supply may be connected in a safe manner. For example, if the load center 106 is connected to the grid power 102, and the grid power has been secured for maintenance, e.g., linemen are attending to a downed line, automatically providing power from the inverter supply to the load center 106 may result in powering of the grid from the invert, thus exposing the linemen to electrical hazards. Accordingly, the monitoring circuitry is configured to preclude connection of the inverter supply in the absence of grid power or a power fault detection.

Should the power monitoring circuitry detect that there is no power fault, e.g., grid power is present and within nominal specifications, then the power monitoring circuitry waits for a connection time delay (206). The connection time delay ensures that the inverter supply is not immediately connected to the load center and ensures that the grid power is stable. The delay may be, for example, 10 seconds or longer. With respect to a power fault, the power monitoring circuitry may detect power faults when one or more of the following occur—a loss of grid power; erratic or irregular grid power (e.g., excessive voltage sag or excessive current, or current inrush), and any other condition that is associated with grid power instability.

After the connection time delay has expired, and if grid power is present and is still without fault, then the monitoring circuitry connects the inverter supply to the load center (208). For example, the inverter side breaker is instructed by the monitoring circuitry to unbond the ground from the neutral in the inverter (if the ground and neutral are bonded), and to connect the neutral conductor of the inverter supply to the neutral conductor of the load center, and the ground conductor of the inverter supply to the ground conductor of the load center. Should the monitoring circuitry also control the coupling of the hot connection, then the monitoring circuitry may also instruct the invert breaker to connect the hot conductor of the inverter supply to the hot conductor of the load center.

Thereafter, the monitoring circuitry continues to monitor for a fault in the grid power (210). As long as a fault is not detected, the inverter supply is connected to the load center 106 through the inverter side breaker.

If a fault is detected, however, then the monitoring circuitry cause the inverter side breaker to disconnect the inverter supply from the load center 106 (212). In some implementations, upon disconnect, the inverter side breaker may again bond the ground of the inverter supply to the neutral of the inverter supply.

In some implementations, the grid side breaker 104 may be configured to receive control signals from the monitoring circuitry and respond accordingly. In these implementations, the monitoring circuitry may disconnect the grid power from the load center and connect the load center to the inverter supply by the grid side breaker (214). For example, the monitoring circuitry instructs the grid side breaker to connect the hot conductor of the inverter supply to the hot conductor of the load center, and to connect the ground conductor of the inverter supply to the ground conductor of the load center.

In variations of the process 200 above, the connection time delay may be omitted, and the system may be connected when grid power is detected and without a power fault condition.

Figure 3:
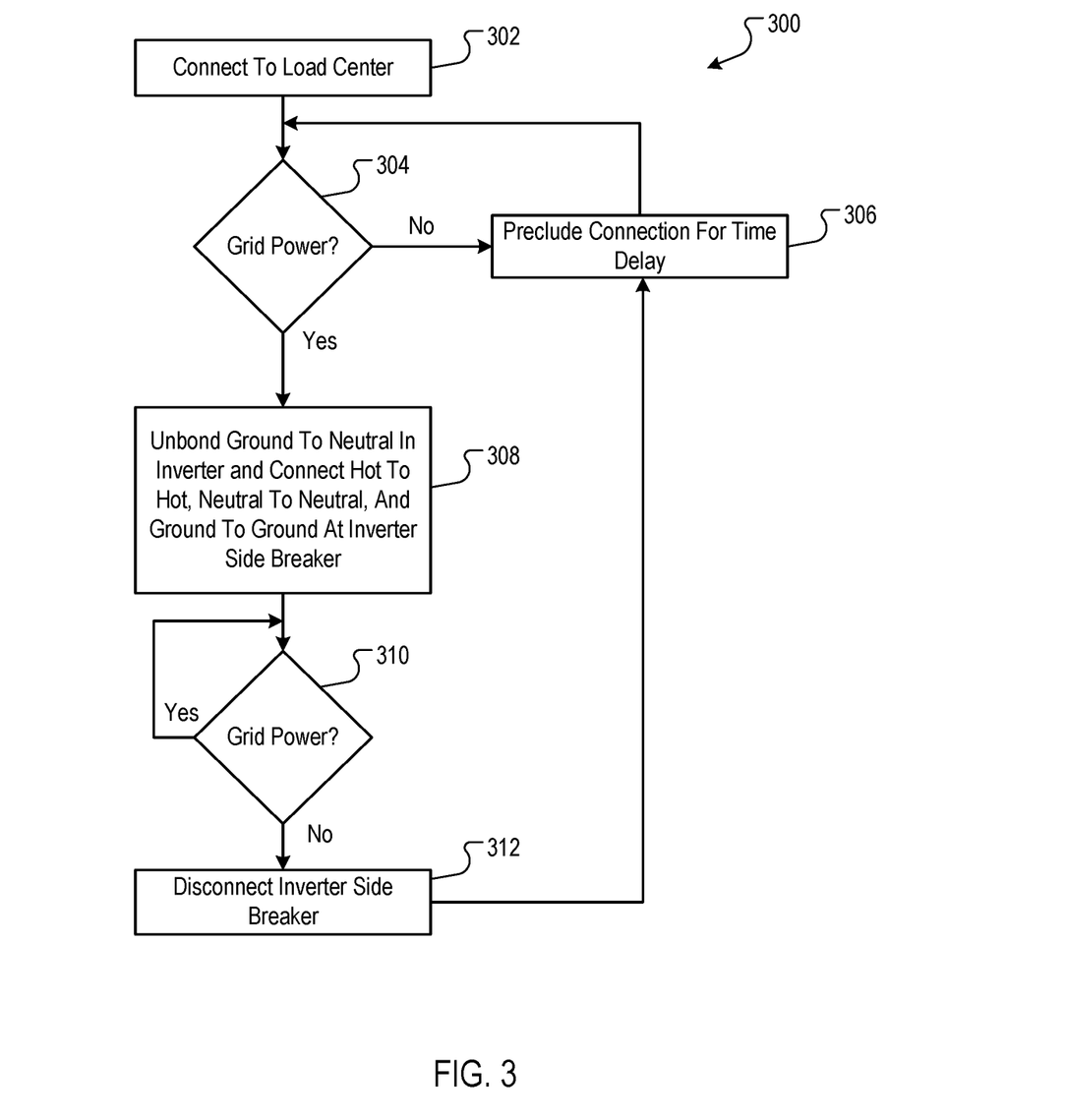
FIG. 3 is a flow diagram of another example process of controlling connection of a portable inverter to a load center.

FIG. 3 is a flow diagram of another example process 300 of controlling connection of a portable inverter to a load center. In this example process, the load center 106 is directly connected to grid power 102, and thus the monitoring circuitry only allows the inverter supply to be connected when there is no grid power fault detected.

The power monitoring circuitry connects to a load center (302). For example, the inverter side breaker output terminals may be connected to the load center 106. The connection may be made by means of a power receptacle connected to the load center 106 that receives a plug that is connected to the inverter side breaker 120. The inverter side breaker 120 is normally open.

The power monitoring circuitry determines if there is grid power (304). For example, the power monitoring circuitry may include voltage sensors connected to the load center side of the inverter side breaker and, by analyzing the detected signals, may determine whether the load center is connected to grid power. Any appropriate power monitoring process and circuitry may be used for this processing step.

If there is no grid power (or a power fault), then the monitoring circuitry precludes connecting for a connection time delay (306). The process then returns to step 304. In this manner, the inverter supply cannot be connected to the load center 106 until after grid power is detected.

Should the power monitoring circuitry detect that there is no power fault, e.g., grid power is present and within nominal specifications, then the power monitoring circuitry connects the inverter supply to the load center (308). The connection process described with reference to step 208 above may be used. Optionally, the connection may be delayed for at least the connection time delay, in a manner similar to that describe with reference to step 206 of FIG. 2 above.

Thereafter, the monitoring circuitry continues to monitor for a fault in the grid power (310). As long as a fault is not detected, the inverter supply is connected to the load center 106 through the inverter side breaker.

If a fault is detected, however, then the monitoring circuitry cause the inverter side breaker to disconnect the inverter supply from the load center 106 (312). The process then proceeds to stage 306, and proceeds as described above.

Figure 4:
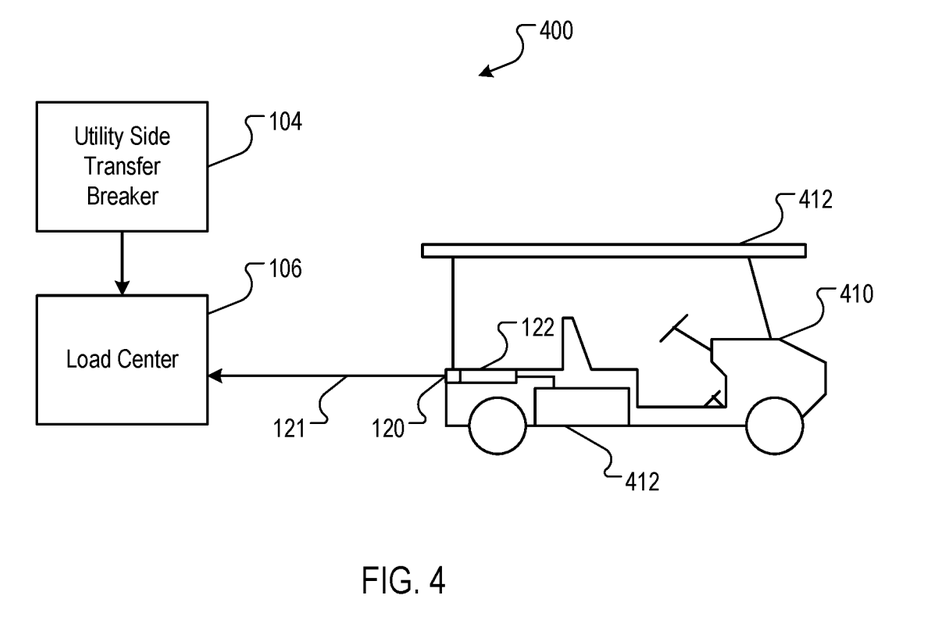
FIG. 4 is a block diagram of a portable inverter connection control system implemented in a solar powered conveyance.

The processes 200 and 300, described above, facilitate the connection of an inverter supply to a load center 106 in a safe and quick manner. This is especially useful in the context of modular powered units connected to a local grid in combination with one or more solar powered portable conveyances. FIG. 4 is a block diagram 400 of a portable inverter connection control system implemented in a solar powered conveyance 410.

The solar powered conveyance 410 includes an array of solar panels 410, batteries 412, inverter supply 122 (which includes charging circuitry, and DC to AC inverter circuitry), and the inverter side breaker and monitor 120. A power coupling 121 may be used to connect the inverter side breaker and monitor 120 to the load center 106.

Figure 5:
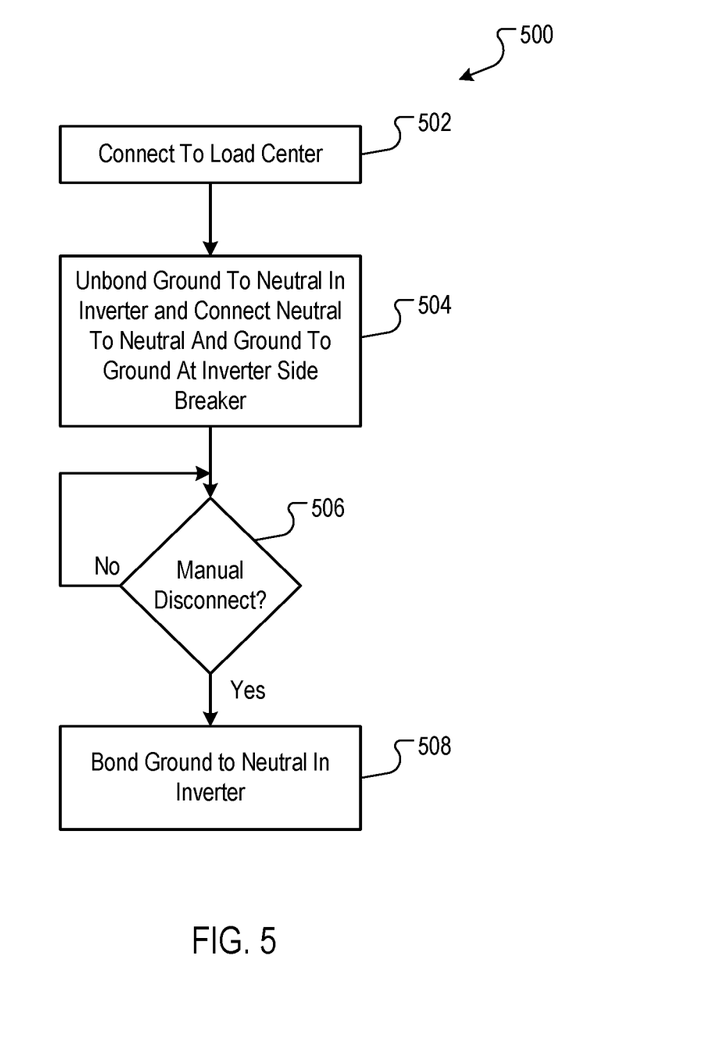
FIG. 5 is a flow diagram of another example process of controlling connection of a portable inverter to a load center.

In some environments, such as remote installations or installations with micro-grids, the connection conditions with respect to utility power may be omitted. For example, in an environment in which the solar powered conveyance (or other portable inverter) is the sole source of power for a modular building, or is used to augment power in a micro-grid, the process 500 of FIG. 5 may be used. In particular, FIG. 5 is a flow diagram of another example process 500 of controlling connection of a portable inverter to a load center.

The power monitoring circuitry connects to a load center (502). For example, the inverter side breaker output terminals may be connected to the load center 106. The connection may be made by means of a power receptacle connected to the load center 106 that receives a plug that is connected to the inverter side breaker 120.

The monitoring circuitry connects the inverter supply to the load center (504). For example, the inverter side breaker is instructed by the monitoring circuitry to unbond the ground from the neutral in the inverter (if the ground and neutral are bonded), and to connect the neutral conductor of the inverter supply to the neutral conductor of the load center, and the ground conductor of the inverter supply to the ground conductor of the load center. Should the monitoring circuitry also control the coupling of the hot connection, then the monitoring circuitry may also instruct the invert breaker to connect the hot conductor of the inverter supply to the hot conductor of the load center.

Thereafter, the monitoring circuitry continues to monitor for a manual disconnect (506). As long as a manual disconnect is not detected, the inverter supply is connected to the load center 106 through the inverter side breaker.

However, when a manual disconnect is detected, the power monitoring circuitry causes the inverter side breaker to bond the ground to neutral in the inverter (508). For example, should an operator of the conveyance 400 disconnect the inverter supply 122 from the load center 106, the ground and neutral of the inverter are automatically bonded.

In yet another implementation, an electro-mechanical switch in a coupler (e.g., a receptacle or plug) may be used instead of monitoring circuitry. The electro-mechanical switch causes the ground and neutral of the inverter to be bonded when the coupler is not coupled to a load center (e.g., the coupler is not receiving a plug from the load center). However, when the couple receives a plug from the load center, the electro-mechanical switch causes the ground and neutral of the inverter to become unbonded.

Figure 6A:
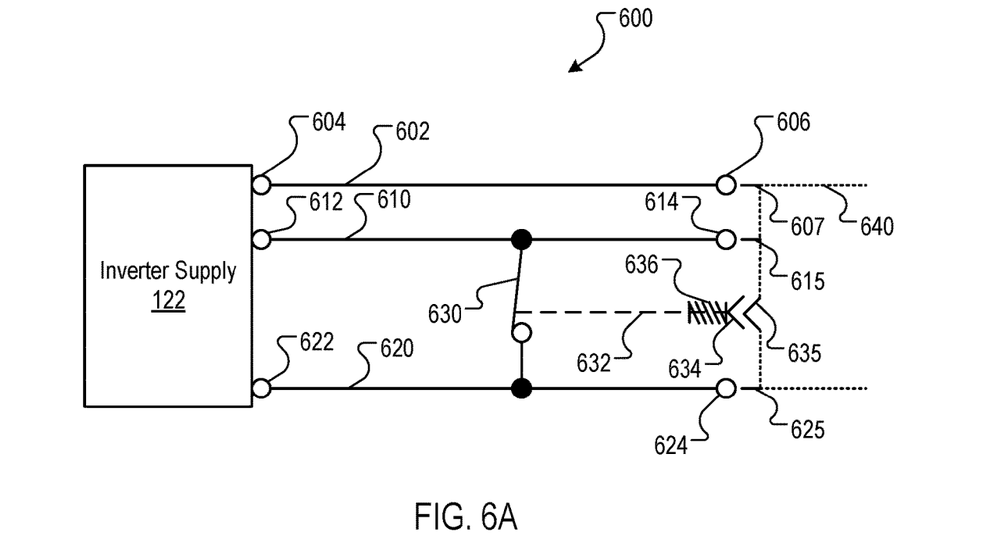
FIGS. 6A and 6B are block diagrams of an example coupler that selectively bonds a ground to neutral.
Figure 6B:
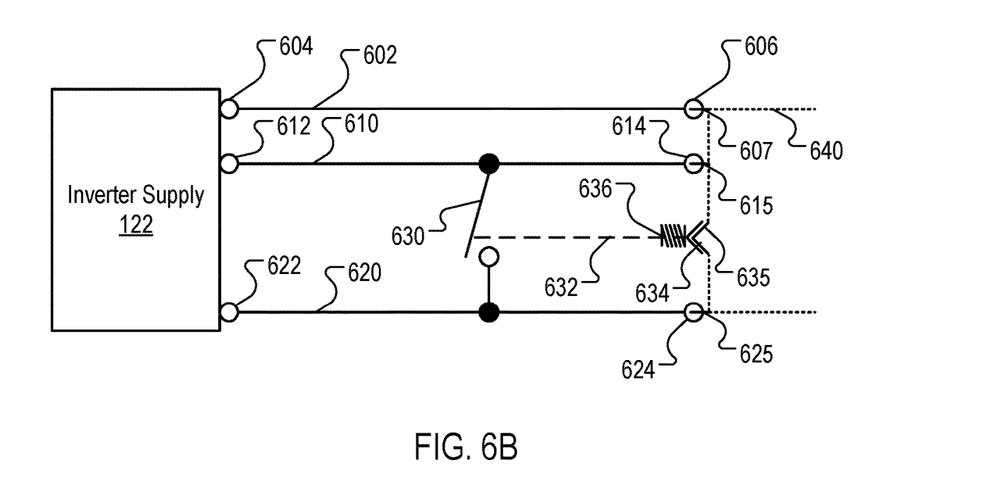

FIGS. 6A and 6B are block diagrams of an example coupler 600 that selectively bonds a ground to neutral. In FIG. 6A, the bonding switch is in the closed state, and in FIG. 6B, the bonding switch 630 is in the open state. Transition from between the states is cause by the insertion or removal of a plug 640 into the coupler 600.

The coupler 600 includes a hot conductor coupling that includes an inverter side hot connector 604 and a load center side hot connector 606 that are connected by a first conductor 602. Likewise, the coupler includes a neutral conductor coupling that includes an inverter side neutral connector 612 and a load center side neutral connector 614 that are connected by a second conductor 610. Finally, the coupler 600 also includes a ground conductor coupling that includes an inverter side ground connector 622 and a load center side ground connector 624 that are connected by a third conductor 620.

The coupler 630 also includes a neutral-to-ground bonding switch that is actuated from a closed state to an open state when the load side center neutral connector 614 and the load side center ground connector 624 are respectively connected to a load center side neutral conductor 615 and a load center side ground conductor 625. In the closed state, the neutral-to-ground bonding switch 630 connects the second conductor 610 to the third conductor 620, and in the open state, the neutral-to-ground bonding switch 630 disconnects the second conductor 610 from the third conductor 620.

In an example implementation, an actuator 632 of the coupler 630 is connected to the neutral-to-ground bonding switch 630 and actuates the neutral-to-ground bonding switch 630 from the closed state to the open state, and from the open state to the closed state, as described above. The actuator 632 comprises a tensioned disconnector 634 that biases the neutral-to-ground bonding switch 630 in an open state. The bias may be provided by a spring 636 in the connector 600 housing. The tensioned disconnector 634 defines a abutting surface that abuts a surface of a plug 640 that is configured to mate with the coupler 600. Upon the plug 640 the plug being inserted into the coupler 600, the pressure on the tensioned disconnector 634 overcomes the bias of the spring 636 and the tensioned disconnector 634 is pressed inward, thereby causing the ground-to-neutral bonding switch 630 transition from the closed state of FIG. 6A to the open state of FIG. 6B.

Although described in the context of a solar powered conveyance, the inverter connection control system may be used for any inverter system, whether portable, mobile, or integrated within a building.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for connecting an inverter supply to a load center, comprising:
   an inverter side breaker and monitor, comprising power monitoring circuitry and switching circuitry, wherein:
      the power monitoring circuitry connects to a load center and monitors for power faults in a grid power feed connected to the load center by a grid side breaker that connects, in a first grid side breaker state, a grid power feed to the load center, wherein the grid power feed includes at least one hot conductor and a neutral conductor, and disconnects the grid power mains from the load center in a second grid side breaker state; and
      in response to not detecting a power fault, the power monitoring circuitry:
         precludes connection of the switching circuitry for a connection time delay;
         after the connection time delay has expired, determines whether a power fault is detected, and in response to not detecting a power fault, then connects by the switching circuitry, after the connection time delay, an inverter supply to the load center by connecting a hot conductor of the inverter supply to a hot conductor of the load center, a neutral conductor of the inverter supply to the neutral conductor of the load center, and a ground conductor of the inverter supply to a ground conductor of the load center.

2. The system of claim 1, wherein the inverter side breaker and monitor, in response to detecting a power fault, disconnects the inverter supply from the load center if the inverter supply is connected to the load center by the switching circuitry of the inverter side breaker.

3. The system of claim 1, wherein the inverter side breaker and monitor, in response to detecting a power fault, precludes the inverter supply from being connected to the load center by the switching circuitry if the inverter supply is not connected to the load center by the switching circuitry.

4. The system of claim 3, wherein the inverter side breaker and monitor precludes the inverter supply from being connected to the load center by the switching circuitry for at least the connection time delay.

5. They system of claim 2, wherein the inverter side breaker and monitor, in response to detecting a power fault:
  instructs the grid side breaker to switch from the first grid side breaker state to the second grid side breaker state to disconnect the grid feed from the load center if the grid side breaker is in the first grid side breaker state; and
  instructs the grid side breaker to connect the hot conductor of the inverter supply to the hot conductor of the load center, and to connect the ground conductor of the inverter supply to the ground conductor of the load center.

6. The system of claim 2, wherein the connection time delay is at least 30 seconds.

7. A system for connecting an inverter supply to a load center, comprising:
  an inverter supply that includes a ground conductor, an neutral conductor, and a hot conductor, each of which may be respectively connected through an inverters supply connector to a load center of a load that is separate from the inverter supply;
  an inverter side breaker and monitor, comprising power monitoring circuitry and switching circuitry, wherein:
  the power monitoring circuitry monitors for a connection of the inverter supply connector to the load center, and wherein the power monitoring circuitry:
    in response to detecting the inverter supply connector is not connected to the load center, bonds the ground conductor of the inverter supply to the neutral conductor of the inverter supply; and
    in response to detecting the inverter supply connector is connected to the load center:
      unbonds the ground conductor of the inverter supply from the neutral conductor of the inverter supply;
      connects a ground conductor of the load center to the ground conductor of the inverter supply; and
      connects the neutral conductor of the load center to the neutral conductor of the inverter supply.

8. The system of claim 7, wherein in response to detecting the inverter supply connector is connected to the load center, the power monitoring circuitry connects a hot conductor of the load center to a hot conductor of the inverter supply.

\* \* \* \* \*